United States Patent [19]

Watanabe

[11] Patent Number: 4,885,672

[45] Date of Patent: Dec. 5, 1989

[54] VOLTAGE REGULATING DEVICE

[75] Inventor: Satoshi Watanabe, Hachioji, Japan

[73] Assignee: Konica Corporation, Tokyo, Japan

[21] Appl. No.: 276,778

[22] Filed: Nov. 28, 1988

[51] Int. Cl.[4] .......... H02M 3/335

[52] U.S. Cl. .......... 363/21; 363/56; 363/97

[58] Field of Search .......... 363/18–21, 363/56, 97, 131

[56] References Cited

U.S. PATENT DOCUMENTS 4,315,303 2/1982 Snyder .......... 363/56

4,389,702 6/1983 Clemente et al. .......... 363/56

4,757,433 7/1988 Santelmann, Jr. .......... 363/56

*Primary Examiner*—Peter S. Wong

*Attorney, Agent, or Firm*—Frishauf, Holtz, Goodman & Woodward

[57] ABSTRACT

Disclosed is a voltage regulating device for supplying a bias voltage for a copy machine. The device comprises an indicating circuit for setting a target output voltage for a CPU, a voltage output circuit capable of regulating output voltage in response to control signal from the CPU, a feedback circuit for inputting a feedback signal corresponding to the output voltage into the CPU, and the CPU for inputting the control signal on the basis of the feedback signal as well as the target output voltage so that the output voltage of the voltage output circuit becomes equal to the target output voltage.

5 Claims, 5 Drawing Sheets

DUTY = α ( TARGET VALUE − INPUTTED VALUE ) + CURRENT DUTY ——— (2)

α : CONSTANT

VOLTAGE REGULATING DEVICE

BACKGROUND OF THE INVENTION

The present invention relates to a voltage regulating device for controlling bias voltage for developing of copying devices, etc.

The circuit shown in FIG. 2 is a bias circuit for developing of copying devices. This circuit permits a 20 kHz rectangular wave signal of a fixed duty cycle to be applied to the terminal 1 to make a transistor Q1 switch rapidly, meanwhile a 200 Hz rectangular wave signal to be applied to the terminal 2 to make a transistor Q2 switch. With the above construction, the voltage applied to the primary side of a transformer T1 via the rectifying and filtering circuits comprising a diode D1 and a capacitor C1 is varied to form voltage in the primary side of the transformer T1, and the induced voltage at the secondary side is rectified in the circuit composed of diodes D2 and D3 and capacitors C2 and C3 to form a doubled voltage, by which negative direct current voltage can be obtained at the terminal 3. The circuit is capable of varying the voltage level obtained at the output terminal 3 by adjusting a variable resistor VR1 for setting image density through varying the duty cycle of the rectangular wave signal input from the terminal 2.

However, in this circuit, characteristic variance of the transformer T1, etc may cause the variation of values of output voltage obtained at the terminal 3 as shown in FIG. 3 even when a rectangular wave of the same duty is input to the terminal 2. In FIG. 3, "a", "b", and "c", respectively, represent the maximum-voltage curve, the minimum-voltage curve, and medium voltage curve.

For the above reasons, the variable resistor VR1 is conventionally adjusted so that the output voltage is made same value when the signal applied to the terminal 2 is in a standard duty ratio. Therefore the above-mentioned adjustment is needed during the manufacturing processes, bringing an increase in production cost. Also values of output voltage obtained at the terminal 3, after adjustment, are varied (except Point A) as shown in FIG. 4. The variation is larger around the maximum and minimum output voltage levels, so that stable pictures cannot be obtained when the device is used for copy machines.

SUMMARY OF THE INVENTION

This invention is directed to improve the above-mentioned disadvantages of the conventional devices. An advantage of the invention is that it does not require the aforesaid adjustment needed in the conventional manufacturing processes. Another advantage is that it provides the output voltages from the minimum to maximum, as directed by operation, without any effects of a variety of characteristics of the tranformers, etc.

To realize the advantages as described above, this voltage regulating device of the invention provides a voltage output circuit capable of regulating output voltage by signals output from a CPU, an input circuit to input feedback signals corresponding to the aforesaid output voltages of the said output circuit, and an indicating circuit indicating a target output voltage to the aforesaid CPU, and permits the output voltage of the said output circuit to be regulated on the basis of feedback signals from the input circuit so as to become the target value indicated by the indicating circuit.

DETAILED DESCRIPTION OF THE INVENTION

Figure 1:
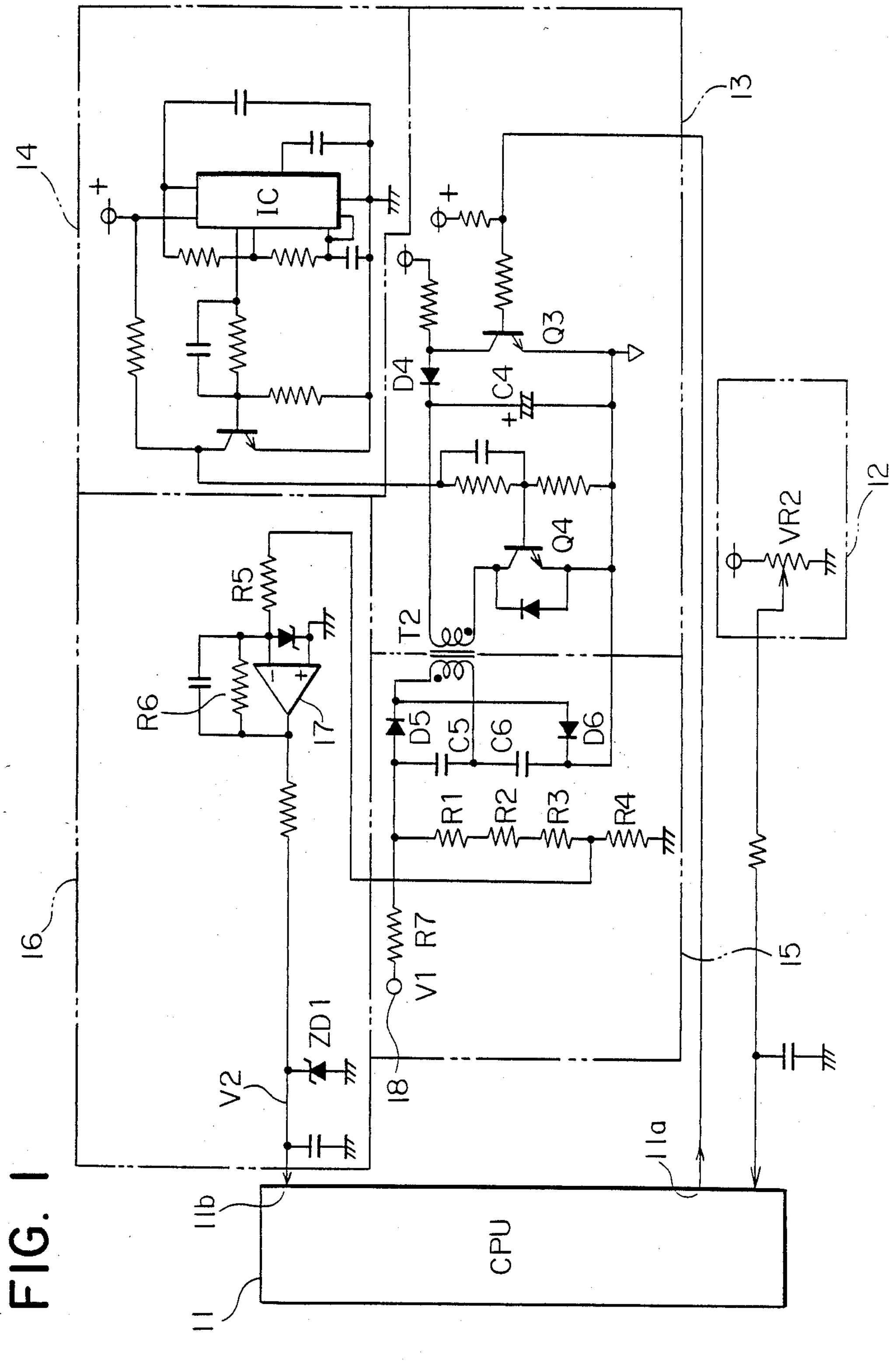
FIG. 1 shows a voltage regulating circuit which is one of the examples of this invention.
Figure 2:
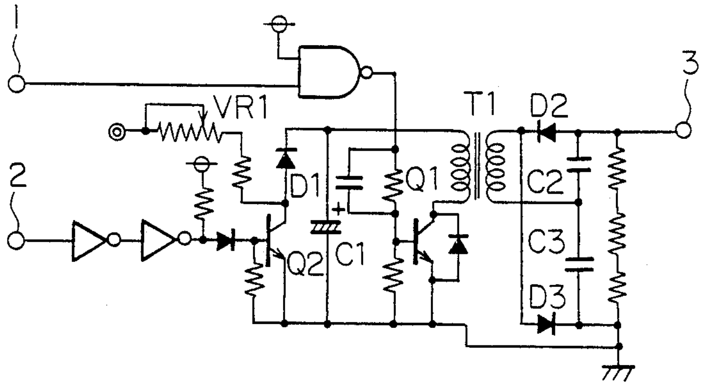
FIG. 2 shows the voltage regulating circuit used for conventional devices.
Figure 3:
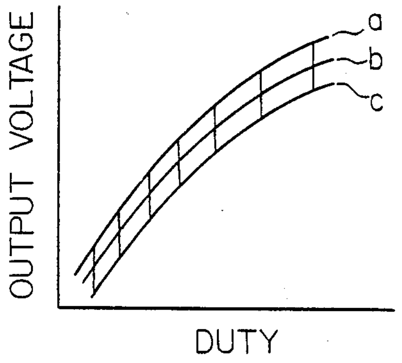
FIGS. 3 4 show output voltage characteristics when the circuit shown in FIG. 2 is used
Figure 4:
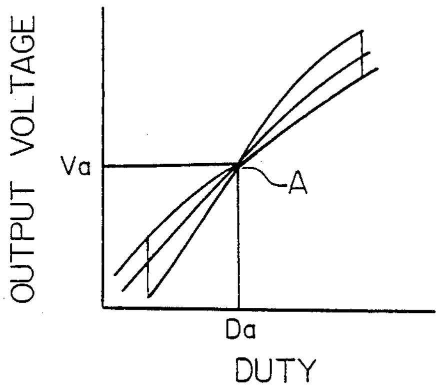

FIG. 1 shows a voltage regulating circuit which is one of the examples of this invention. Number 11 indicates the CPU storing the program described hereinafter, number 12 the indicating circuit having the variable resistor VR2 for setting the density of pictures to the said CPU 11, number 13 the exciting circuit which excites the transformer T2 through switching action caused by the rectangular wave voltage output from the output terminal 11*a* of CPU 11 and high-frequency voltage with fixed duty cycle output from the rectangular-wave generating circuit 14, number 15 the output voltage circuit rectifying the doubled voltage which is obtained at the secondary side of the transformer T2, and number 16 the input circuit inputting the output voltage signal obtained at the rectifying output circuit 15 as a feedback signal into CPU 11.

The above-mentioned exciting circuit 13 is switched by the rectangular wave output voltage from the terminal 11*a* of CPU 11 by the transistor Q3 so that the output voltage of the rectifying and filtering circuits composed of the diode D4 and the capacitor C4, which is applied to the primary side of the transformer T2, is set. The transformer T2 is fed by the transistor Q4, which is switched by a 20 kHz rectangular wave signal with fixed duty cycle output from the rectangular-wave generating circuit. The output voltage circuit 15 is equipped with the diodes D5 and D6 for voltage doubler rectifier and the capacitors C5 and C6. And the double rectified voltage thereof is divided by the resistances R1 through R4 and output into the input circuit 16. This input circuit 16 has the operational amplifier 17 used as an inverting amplifier and the resistances R4 and R5 which regulate the extent of amplification. Excessive voltage against the analog input terminal 11*b* of CPU11 is clipped by the Zener diode ZD1.

The output voltage V2 input from the input circuit 16 to the input terminal 11*b* of CPU11 is represented by the following equation.

$$V2=-\{R6/R5\}\times\{R4/R1+R2+R3+R4\}\times V1 \qquad (1)$$

In the above-mentioned equation, V1 indicates the voltage output from the output terminal 18 of the rectifier output circuit 15. The second term of the right side of the equation (1) shows the coefficient when the voltage obtained at the output terminal 18 is divided by the resistances R1 through R4. The output terminal 18 conducts little current so that a voltage drop at the resistance R7 can be ignored. The first term of the right side is the coefficient indicating an amplifying rate for the inversion of the operational amplifier 17. Since the voltage formed at the output terminal 18 is negative, the polarity is inverted by using the opoerational amplfier.

The negative voltage cannot be applied to the analog input terminal 11*b* of CPU11.

CPU11 is capable of regulating the duty cycle of the rectangular wave signal output from the output terminal 11a so that the voltage applied to the analog input terminal 11b shall be in accordance with the voltage value of V2 calculated by the above-mentioned equation (1) when the voltage applied to the output terminal 18 is defined by programming or the variable resistor VR2 set on the indicating circuit 12. Therefore the intended voltage can be obtained at the output terminal 18 without any effects such as fluctuation, etc. When the voltage of the analog input terminal 11*b* of CPU11 exceeds the maximum input level due to trouble in the exciting circuit 13 regulating the voltage applied to the primary side of the transformer T2, the Zener diode ZD1 prevents excessive voltage from being applied. When the voltage of the analog input terminal 11*b* at the maximum voltage level of the output terminal 18 exceeds the value calculated by the equation (1), CPU11 detects the excessive voltage as a malfunction of the circuit and emits a warning signal.

Namely, according to the invention, in the CPU is provided a plurality of target ranges for detecting the abnormal voltage with respect to the target voltage value.

Figure 5:
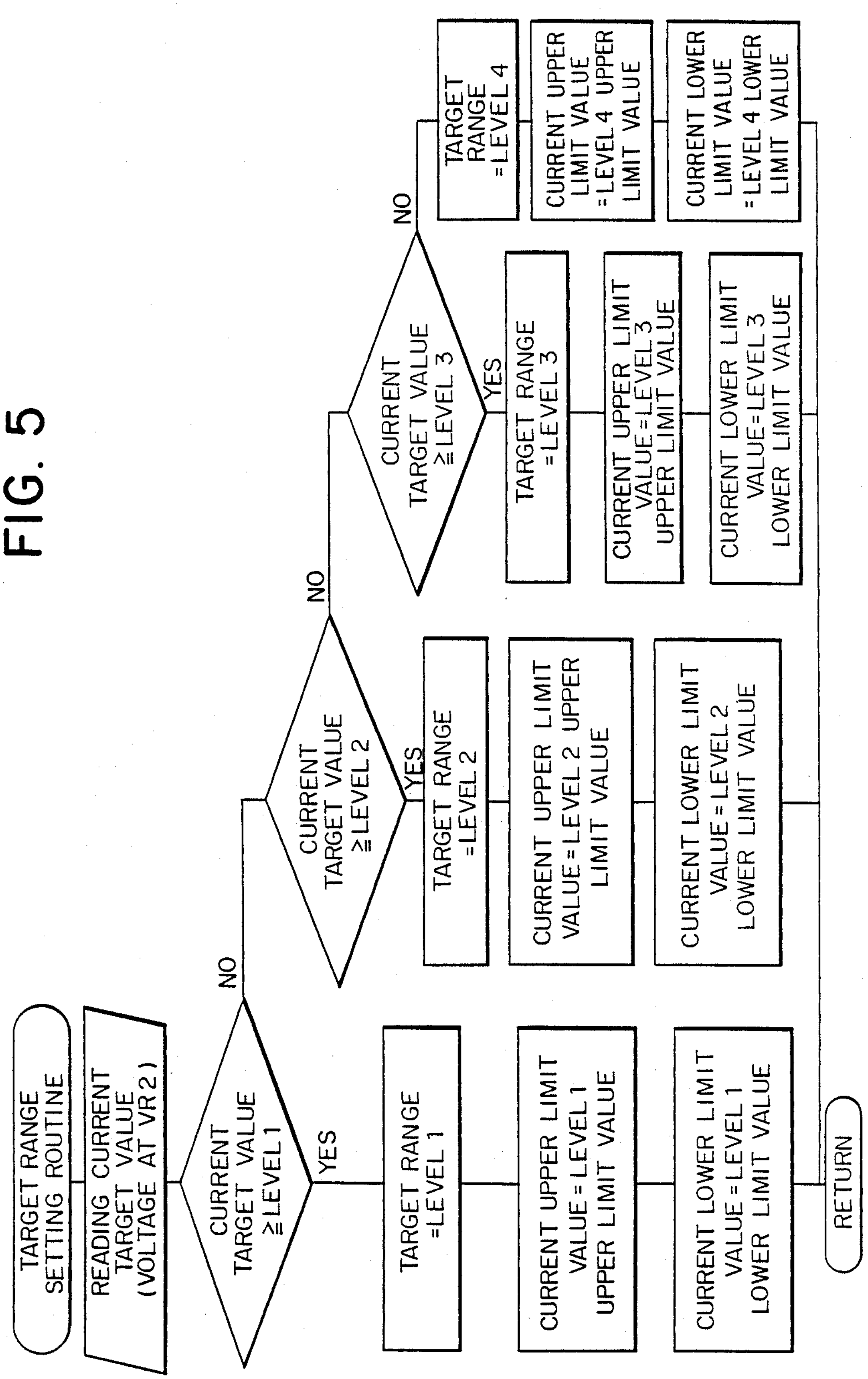
FIGS. 5, 6 and 7 are flow charts indicating steps of checking output voltage.

Once the copier starts its operation, it calls a target range setting routine as shown in FIG. 5. In this setting routine, a current target value indicated at VR2 in FIG. 1 is converted from an analog signal to a digital signal and inputted into CPU11. If this current target value is greater than a target range of Level-1, the Level-1 is set as the current target range, and the upper limit value and the lower limit value of the target range are also set as those of the current target value respectively. In the case that the current target value is lower than the target range of Level-1, the current target value is compared with target ranges of Level-2 and Level-3 as well in order to set a current target range, and its current upper limit value and lower limit value.

Figure 6:
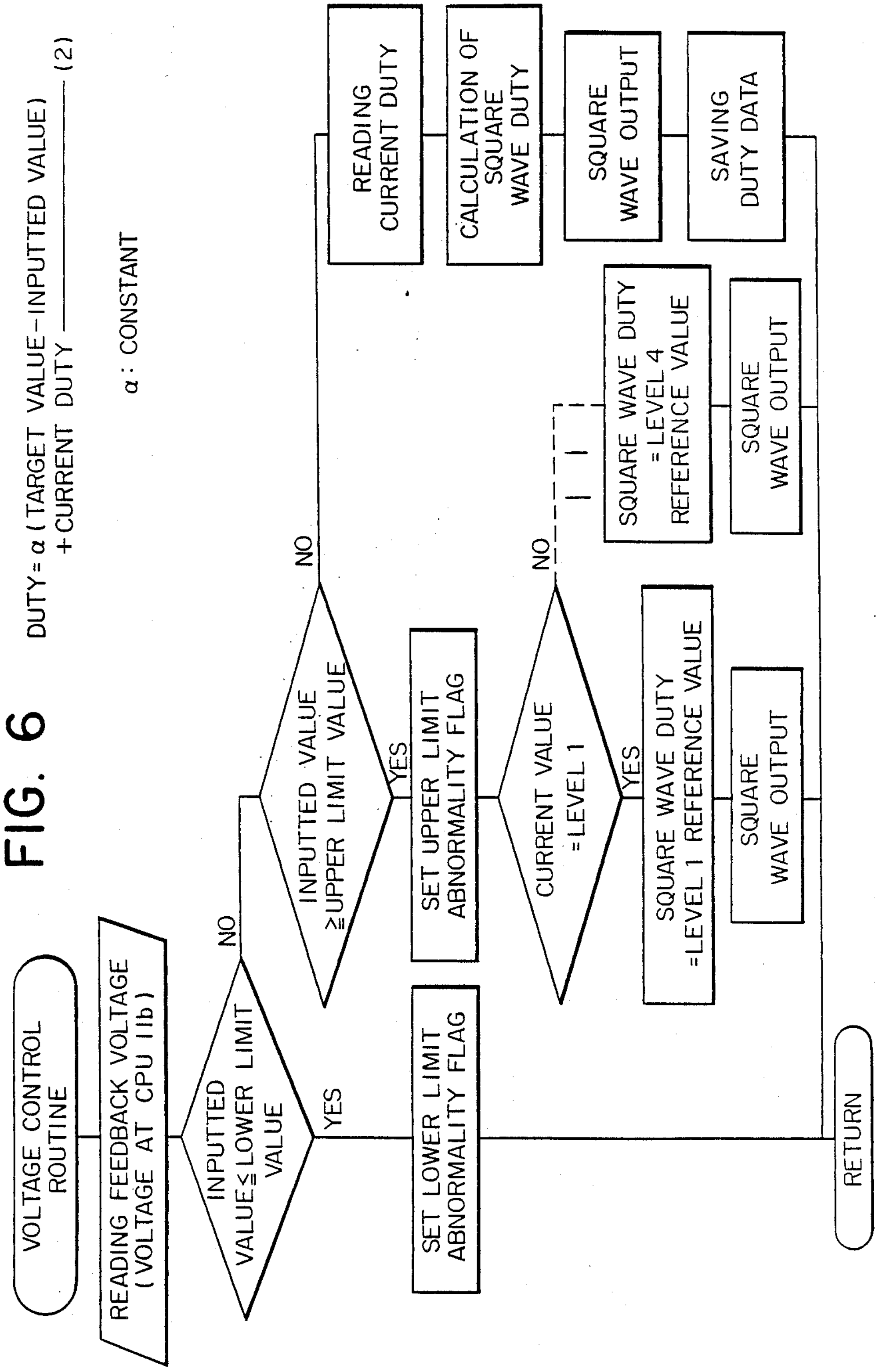

During the operation of the copier, a voltage control routine shown in FIG. 6 is called periodically. In this control routine, a feedback voltage is converted from an analog signal to a digital signal and inputted into CPU as mentioned above. If the inputted feedback value is lower than the above-mentioned lower limit value, it is recognized as unusual and sets a lower limit abnormality flag. Also, if the inputted feedback value is greater than the above-mentioned upper limit value, it is also recognized as unusual and sets an upper limit abnormality flag; at the same time, the voltage target level of the current target value is checked, the duty cycle of a square wave is set at a reference value of the target level, and a square wave output is continued.

If the inputted current value is within a normal range, a square wave duty cycle, which is calculated in Equation (2) (see FIG. 6), is outputted to obtain the target value.

Figure 7:
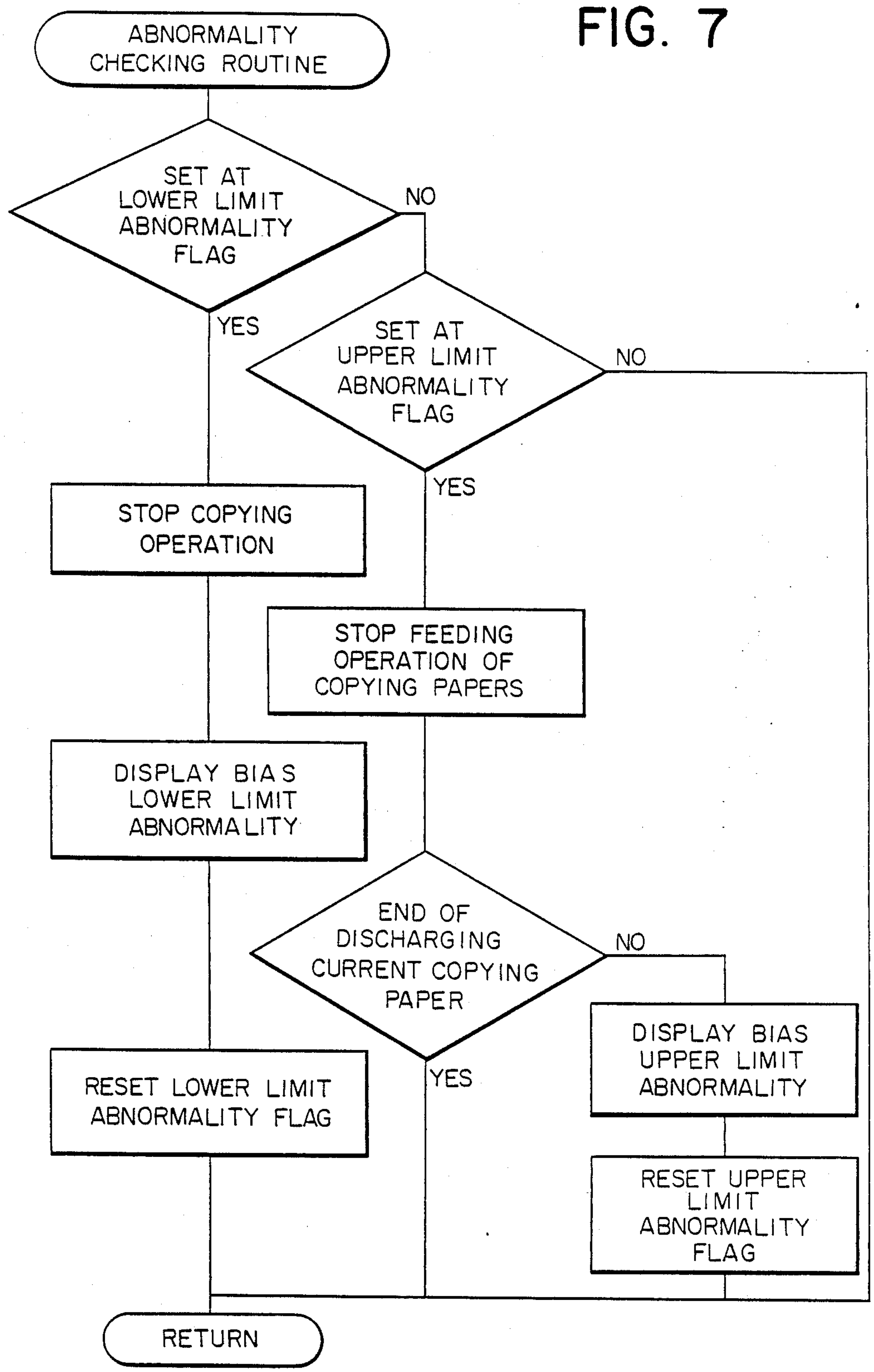

Abnormality checking routine, shown in FIG. 7, is being checked; than the above mentioned lower limit abnormality flag is set, it stops the copying operation and indicates bias lower limit abnormality. Also, if the above-mentioned upper limit abnormality flag is set, it stops the feeding operation of next copying papers, continues copy operation for current copying papers by setting the reference value of the target level, and indicates the upper limit abnormality after the copying on the transfer paper remaining in the machine is finished.

In the above example, four kinds of target level are provided. However, it is possible to increase the kinds of the target level.

Accordingly, the advantages of this invention are that the output voltage is automatically adjusted to the intended level by the output voltage signal fed back to the CPU so that the device of this invention not only is free of the conventional adjustment at manufacturing processes but also has few effects from variation of the transformer characteristics, etc.

Additionally, the CPU performs to check the output voltage through the feedback circuit so that any trouble caused by malfunction of the device can be prevented.

What is claimed is:

1. A voltage regulating device comprising:

designation means for generating a target signal having a preset level related to a selected target voltage;

processing means responsive to the target signal for generating an analog process signal related to the target signal;

a signal generating means for generating a signal to modify the analog process signal;

a feedback circuit means for providing to said processing means a feedback signal corresponding to the analog process signal, said processing means being coupled to the signal generating means for, in response to the feedback signal, modifying the analog process signal to maintain it at the preset level;

wherein, said processing means includes means to choose one of a plurality of preprogrammed target ranges in accordance with the target signal from said designation means, so that when the feedback signal moves out of said target range, said processing means judges the feedback signal as being abnormal and generates a control signal.

2. The voltage regulating device of claim 1, wherein the signal from said signal generating means to modify the process signal is a switching signal that has a predetermined duty cycle at the frequency of 20 kHz, and said processing means controls a duty cycle of the analog process signal to be at a frequency lower than the frequency of the switching signal.

3. The voltage regulating device of claim 2, wherein said processing means outputs an abnormal signal when said feedback signal is determined by the processing means to be abnormal.

4. The voltage regulating device of claim 3, wherein the feedback signal is used to provide a developing bias voltage for controlling a photocopying device.

5. The voltage regulating device of claim 1, wherein the processing means is a programmable digital processor.

* * * * *

UNITED STATES PATENT AND TRADEMARK OFFICE
CERTIFICATE OF CORRECTION

PATENT NO. : 4,885,672

DATED : December 5, 1989

INVENTOR(S) : Satoshi WATANABE

It is certified that error appears in the above-identified patent and that said Letters Patent is hereby corrected as shown below:

In the title page, insert the following:

--[30] Foreign Application Priority Data

December 4, 1987 Japan.....62-305815 --.

Signed and Sealed this

Twenty-fourth Day of July, 1990

*Attest:*

HARRY F. MANBECK, JR.

*Attesting Officer* *Commissioner of Patents and Trademarks*